(12) United States Patent
Halalay et al.

(10) Patent No.: US 11,349,119 B2
(45) Date of Patent: May 31, 2022

(54) METHOD FOR MAKING SILICON-CONTAINING COMPOSITE ELECTRODES FOR LITHIUM-BASED BATTERIES

(71) Applicant: GM GLOBAL TECHNOLOGY OPERATIONS LLC, Detroit, MI (US)

(72) Inventors: Ion C. Halalay, Grosse Pointe Park, MI (US); Timothy J. Fuller, Warren, MI (US); Michael P. Balogh, Novi, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 74 days.

(21) Appl. No.: 16/160,799

(22) Filed: Oct. 15, 2018

(65) Prior Publication Data
US 2020/0119339 A1  Apr. 16, 2020

(51) Int. Cl.
*H01M 4/36* (2006.01)
*H01M 10/0525* (2010.01)

(52) U.S. Cl.
CPC ........ *H01M 4/366* (2013.01); *H01M 10/0525* (2013.01); *H01M 2220/20* (2013.01)

(58) Field of Classification Search
CPC ............. H01M 4/366; H01M 10/0525; H01M 2220/20
See application file for complete search history.

(56) References Cited

U.S. PATENT DOCUMENTS

| 8,440,350 B1 | 5/2013 | Verbrugge et al. |
| 8,859,144 B2 | 10/2014 | Xiao |

(Continued)

FOREIGN PATENT DOCUMENTS

| CN | 111048747 A | 4/2020 |
| DE | 102019115818 A1 | 4/2020 |

OTHER PUBLICATIONS

Assresahegn, Birhanu Desalegn et al., "Effects of the Formulations of Silicon-Based Composite Anodes on their Mechanical, Storage, and Electrochemical Properties," *ChemSusChem*, 2017, 10, pp. 4080-4089, Published online: Sep. 25, 2017, DOI: 10.1002/cssc.201701281.

(Continued)

*Primary Examiner* — Osei K Amponsah
(74) *Attorney, Agent, or Firm* — Harness, Dickey & Pierce, P.L.C.

(57) ABSTRACT

Electroactive materials having a nitrogen-containing carbon coating and composite materials for a high-energy-density lithium-based, as well as methods of formation relating thereto, are provided. The composite electrode material includes a silicon-containing electroactive material having a substantially continuous nitrogen-containing carbon coating formed thereon. The method includes contacting the silicon-containing electroactive material and one or more nitrogen-containing precursor materials and heating the mixture. The one or more nitrogen-containing precursor materials include one or more nitrogen-carbon bonds and during heating the nitrogen of the one or more nitrogen-carbon bonds with silicon in the silicon-containing electroactive material to form the nitrogen-containing carbon coating on exposed surfaces of the silicon-containing electroactive material.

10 Claims, 2 Drawing Sheets

(56) References Cited

U.S. PATENT DOCUMENTS

| | | | |
|---|---|---|---|
| 8,999,584 B2 | 4/2015 | Jiang et al. | |
| 9,005,811 B2 | 4/2015 | Xiao et al. | |
| 9,093,705 B2 | 7/2015 | Xiao et al. | |
| 9,142,830 B2 | 9/2015 | Xiao et al. | |
| 9,178,208 B2 | 11/2015 | Park et al. | |
| 9,302,914 B2 | 4/2016 | Liu et al. | |
| 9,362,551 B2 | 6/2016 | Sachdev et al. | |
| 9,379,374 B2 | 6/2016 | Liu et al. | |
| 9,397,338 B2 | 7/2016 | Park et al. | |
| 9,531,004 B2 | 12/2016 | Xiao et al. | |
| 9,553,303 B2 | 1/2017 | Park et al. | |
| 9,564,639 B2 | 2/2017 | Huang | |
| 9,570,752 B2 | 2/2017 | Huang et al. | |
| 9,577,251 B2 | 2/2017 | Xiao et al. | |
| 9,583,757 B2 | 2/2017 | Park et al. | |
| 9,780,361 B2 | 10/2017 | Xiao et al. | |
| 9,806,328 B2 | 10/2017 | Park et al. | |
| 10,062,898 B2 | 8/2018 | Xiao | |
| 2006/0040182 A1* | 2/2006 | Kawakami | H01M 10/052 429/218.1 |
| 2012/0251895 A1* | 10/2012 | Mun | H01M 10/0567 429/338 |
| 2014/0065488 A1* | 3/2014 | Lee | C01B 32/21 429/231.8 |
| 2015/0118559 A1* | 4/2015 | Ito | C01B 32/05 429/221 |
| 2017/0179482 A1 | 6/2017 | Verbrugge et al. | |
| 2018/0083268 A1 | 3/2018 | Huang | |
| 2018/0205114 A1 | 7/2018 | Pauric et al. | |

OTHER PUBLICATIONS

Cao, Peng-Fei et al., "Superstretchable, Self-Healing Polymeric Elastomers with Tunable Properties," *Adv. Funct. Mater.*, 2018, 28, 1800741, 9 pages, Published online: Apr. 16, 2018, DOI: 10.1002/adfm.201800741.

Cheng, Yong et al., "Influence of copper addition for silicon-carbon composite as anode materials for lithium ion batteries," *RSC Adv.*, 2016, 6, pp. 56756-56764, Published online: Jun. 8, 2016, DOI: 10.1039/c6ra12332e.

Choi, Min-Jae et al., "Novel strategy to improve the Li-storage performance of micro silicon anodes," *Journal of Power Sources*, 2017, 348, pp. 302-310, Published online Mar. 10, 2017, DOI: 10.1016/j.jpowsour.2017.03.020.

Gómez-Cámer, Juan Luis et al., "Anchoring Si nanoparticles to carbon nanofibers: an efficient procedure for improving SI performance in Li batteries," *J. Mater. Chem.*, 2011, 21, pp. 811-818, Published Nov. 8, 2010, DOI: 10.1039/c0jm01811b.

Hassan, Fathy M. et al., "Engineered Si Electrode Nanoarchicture: A Scalable Postfabrication Treatment for the Production of Next-Generation Li-Ion Batteries," *Nano Lett.*, 2014, 14, pp. 277-283, Published Dec. 12, 2013, DOI: 10.1021/nl403943g.

Huang, Xingkang et al., "Improved Cyclic Performacne of Si Anodes for Lithium-Ion Batteries by Forming Intermetallic Interphases between Si Nanoparticles and Metal Microparticles," *ACS Appl. Mater. Interfaces*, 2013, 5, pp. 11965-11970, Published Oct. 21, 2013, DOI: 10.1021/am403718u.

Jeong, You Kyeong et al., "Mussel-Inspired Coating and Adhesion for Rechargeable Batteries: A Review," *ACS Appl. Mater. Interfaces*, 2018, 10, pp. 7562-7573, Published online: Sep. 22, 2017, DOI: 10.1021/acsami.7b08495.

Jia, Haiping et al., "A novel approach to synthesize micrometer-sized porous silicon as a high performance anode for lithium-on batteries," *Nano Energy*, 2018, 50, pp. 589-597, Published online: May 21, 2018, DOI: 10.1016/j.nanoen.2018.05.048.

Joyce, Christopher et al., "Metallic Copper Binders for Lithium-Ion Battery Silicon Electrodes," *Journal of the Electrochemical Society*, 2012, 159 (6), pp. A909-A914, Published May 2, 2012, DOI: 10.1149/2.107206jes.

Kim, Donghyuk et al., "Freestanding silicon microparticle and self-healing polymer composite design for effective lithiation stress relazation," *J. Mater. Chem. A*, 2016, 6, pp. 11353-11361, Publsihed Jun. 4, 2018, DOI: 10.1039/c7ta11269f.

Kim, Jae Woo et al., "Improvement of silicon powder negative electrodes by copper electroless deposition for lithium secondary batteries," *Journal of Power Sources*, 2005, 147, pp. 227-233, Published online: Feb. 25, 2005, DOI: 10.1016/j.jpowsour.2004.12.041.

Leblanc, Dominic et al., "Silicon as anode for high-energy lithium ion batteries: From molten ingot to nanoparticles," *Journal of Power Sources*, 2015, 299, pp. 529-536, Published online: Sep. 21, 2015, DOI: 10.1016/j.powsour.2015.09.040.

Lestriez, B. et al., "Hierarchical and Resilient Conductive Network of Bridged Carbon Nanotubes and Nanofibers for High-Energy Si Negative Electrodes," *Electrochemical and Solid-State Letters*, 2009, 12, 4, pp. A76-A80.

Lu, Zhenda et al., "Nonfilling Carbon Coaring of Porous Silicon Micrometer-Sized Particles for High-Performacne Lithium Battery Anodes," *ACS Nano*, 2015, 9, pp. 2540-2547, Published online Mar. 4, 2015, DOI: 10.1021/nn505410q.

Mazouzi, Driss et al., "Very High Surface Capacity Observed Using Si Negative Electrodes Embedded in Copper Foam as 3D Current Collectors," *Adv. Energy Mater.*, 2014, 4, 1301718, 13 pages, Published online: Feb. 13, 2014, DOI: 10.1002/aenm.201301718.

Munaoka, Takatoshi et al., "Ionically Conductive Self-Healing Binder for Low Cost Si Microarticles Anodes in Li-Ion Batteries," *Adv. Energy Mater.*, 2018, 8, 1703138, 11 pages, Published online: Feb. 12, 2018, DOI: 10.1002/aenm.201703138.

Polat, B.D. et al., "Improving Si anode Performance by Forming Copper Capped Copper-Silicon Thin Film Anodes for Rechargeable Lithium Ion Batteries," *Electrochimica Acta*, 2015, 170, pp. 63-71, Published online Apr. 25, 2015, DOI: 10.1013/j.electacta.2015.04.131.

Sethuraman, Vijay A. et al., "Increased cycling efficiency and rate capability of copper-coated silicon anodes lin lithium-ion batteries," *Journal of Power Sources*, 2011, 196, pp. 393-398, Published online Jun. 23, 2010, DOI: 10.1016/j.jpowsour.2010.06.043.

Wang, Chao et al., "Self-healing chemistry enables the stable operation of silicon microparticle anodes for high-energy lithium-ion batteries," *Nature Chemistry*, 2013, 5, pp. 1042-1048, Published online Nov. 17, 2013, DOI: 10.1038/nchem.1802.

Wang, Jing et al., "Encapsulating micro-nano $Si/SiO_x$ into conjugated nitrogen-doped carbon as binder-free monolithic anodes for advanced lithium ion batteries," *Nanoscale*, 2015, 7, pp. 8023-8034, Published Mar. 23, 2015, DOI: 10.1039/5nr01209k.

Yoon, Sukeun et al., "Enhancement of capacity of carbon-coated $Si-Cu_3Si$ composite anode using metal-organic compound for lithium-ion batteries," *Journal of Power Sources*, 2006, 161, pp. 1319-1323, Published online: Jul. 24, 2006, DOI: 10.1016/j.jpowsour.2006.06.035.

* cited by examiner

METHOD FOR MAKING SILICON-CONTAINING COMPOSITE ELECTRODES FOR LITHIUM-BASED BATTERIES

INTRODUCTION

This section provides background information related to the present disclosure which is not necessarily prior art.

The present disclosure pertains to silicon-containing electroactive materials having a nitrogen-containing carbon coating and methods of formation relating thereto.

By way of background, high-energy density, electrochemical cells, such as lithium ion batteries can be used in a variety of consumer products and vehicles, such as Hybrid Electric Vehicles (HEVs) and Electric Vehicles (EVs). Typical lithium ion batteries comprise a first electrode (e.g., a cathode), a second electrode (e.g., an anode), an electrolyte material, and a separator. Often lithium ion battery cells are electrically connected in a stack to increase overall output. Conventional lithium ion batteries operate by reversibly passing lithium ions between the negative electrode and the positive electrode. The separator and electrolyte are disposed between the negative and positive electrodes. The electrolyte is suitable for conducting lithium ions and may be in solid or liquid form. Lithium ions move from a cathode (i.e., positive electrode) to an anode (i.e., negative electrode) during charging of the battery, and in the opposite direction when discharging the battery.

The potential difference or voltage of a battery cell is determined by differences in chemical potentials (e.g., Fermi energy levels) between the electrodes. Under normal operating conditions, the potential difference between the electrodes achieves a maximum achievable value when the battery cell is fully charged and a minimum achievable value when the battery cell is fully discharged. The battery cell will discharge and the minimum achievable value will be obtained when the electrodes are connected to a load performing the desired function (e.g., electric motor, light bulb) via an external circuit. Each of the negative and positive electrodes in the battery cell is connected to a current collector (typically a metal, such as copper for the anode and aluminum for the cathode). The current collectors associated with the two electrodes are connected by an external circuit that allows current generated by electrons to pass between the electrodes to compensate for transport of lithium ions across the battery cell. For example, during cell discharge, the internal $Li^+$ ionic current from the negative electrode to the positive electrode may be compensated by the electronic current flowing through the external circuit from the negative electrode to the positive electrode of the battery cell.

Many different materials may be used to create components for a lithium ion battery. For example, positive electrode materials for lithium batteries typically comprise an electroactive material which can be intercalated with lithium ions, such as lithium-transition metal oxides or mixed oxides, for example including $LiMn_2O_4$, $LiCoO_2$, $LiNiO_2$, $LiMn_{1.5}Ni_{0.5}O_4$, $LiNi_{(1-x-y)}Co_xM_yO_2$ (where $0<x<1$, $y<1$, and M may be Al, Mn, or the like), or one or more phosphate compounds, for example including lithium iron phosphate or mixed lithium manganese-iron phosphate. The electrolyte typically contains one or more lithium salts, which may be dissolved and ionized in an aprotic non-aqueous solvent. The negative electrode typically includes a lithium insertion material or an alloy host material. For example, typical electroactive materials for forming an anode include graphite and other forms of carbon, silicon and silicon oxide, tin and tin alloys.

Certain anode materials have particular advantages. While graphite having a theoretical specific capacity of 372 $mAh \cdot g^{-1}$ is most widely used in lithium-ion batteries, anode materials with high specific capacity, for example high specific capacities ranging about 900 $mAh \cdot g^{-1}$ to about 4,200 $mAh \cdot g^{-1}$, are of growing interest. For example, silicon has the highest known theoretical capacity for lithium (e.g., about 4,200 $mAh \cdot g^{-1}$), making it one of the most appealing materials for rechargeable lithium ion batteries. However, anodes comprising silicon may suffer from significant drawbacks. For example, excessive volumetric expansion and contraction during successive charging and discharging cycles. Such volumetric changes may lead to fatigue cracking and decrepitation of the electroactive material, which in turn may cause a loss of electrical contact between the silicon-containing electroactive material and the rest of the battery cell resulting in poor capacity retention and premature cell failure. This is especially true at electrode loading levels required for the application of silicon-containing electrodes in high-energy lithium-ion batteries, such as those used in transportation applications.

Accordingly, it would be desirable to develop materials and methods that successfully use silicon as an electroactive material in commercial lithium-ion batteries, especially for transportation applications. In addition, it would be desirable that such materials and methods also enhance the fast charging capabilities of the lithium-ion battery.

SUMMARY

This section provides a general summary of the disclosure, and is not a comprehensive disclosure of its full scope or all of its features.

The present disclosure relates to methods for making silicon-containing composite electrodes for lithium-based batteries.

In various aspects, the present disclosure provides a method of forming a coated electroactive material for use in an electrochemical cell that cycles lithium ions. The method includes contacting a silicon-containing electroactive material and one or more nitrogen-containing precursor materials and heating the mixture to a temperature ranging from greater than or equal to about 200° C. to less than or equal to about 1,300° C. The one or more nitrogen-containing precursor materials each include one or more nitrogen-carbon bonds. The one or more nitrogen-containing precursor materials may be selected from the group consisting of: melamine, cyanuric acid, nicotine, 1,10-phenanthroline, carbazole, adenine, guanine, dopamine, branched or linear poly(ethyleneimine), poly(4-vinylpyridine), poly(3,5-pyridine), poly(4-vinylpyridine-co-divinylbenzene), poly(4-vinylpyridine-co-styrene), poly(melamine-co-formaldehyde), polypyrrole, polyaniline, and combinations thereof. During heating, nitrogen (in the one or more nitrogen-carbon) bonds with silicon in the silicon-containing electroactive material to form a nitrogen-containing carbon coating on exposed surfaces of the silicon-containing electroactive material to form the coated electroactive material.

In one aspect, the silicon-containing electroactive material may be in the form of a plurality of particles having an average diameter ranging from greater than or equal to about 50 nm to less than or equal to about 20 μm.

In one aspect, the nitrogen-containing carbon coating may have an average thickness ranging from greater than or equal to about 5 nm to less than or equal to about 20 nm.

In one aspect, after the heating of the silicon-containing electroactive material and the one or more nitrogen-containing precursor materials to a temperature ranging from greater than or equal to about 200° C. to less than or equal to about 1300° C., the method may further include pyrolyzing by heating the silicon-containing electroactive material and the one or more nitrogen-containing precursor materials to a temperature ranging from greater than or equal to about 900° C. to less than or equal to about 1,300° C.

In various other aspects, the present disclosure provides a method of forming a polymeric-binder-free electrode for use in an electrochemical cell that cycles lithium ions. The method includes disposing a precursor layer onto at least a select region of a surface of a metallic substrate to form the polymeric-binder-free electrode. The precursor layer includes a solvent, a silicon-containing electroactive material, and one or more nitrogen-containing precursor materials. The one or more nitrogen-containing precursor materials may be selected from the group consisting of: melamine, cyanuric acid, nicotine, 1,10-phenanthroline, carbazole, adenine, guanine, dopamine, branched or linear poly(ethyleneimine), poly(4-vinylpyridine), poly(3,5-pyridine), poly(4-vinylpyridine-co-divinylbenzene), poly(4-vinylpyridine-co-styrene), poly(melamine-co-formaldehyde), polypyrrole, polyaniline, and combinations thereof. The method may further include, heating the precursor layer and the substrate to a temperature ranging from greater than or equal to about 200° C. to less than or equal to about 1300° C. to form a nitrogen-containing carbon coating on exposed surfaces of the silicon-containing electroactive material.

In one aspect, the method may further include pyrolyzing by heating the precursor layer and the substrate to a temperature ranging from greater than or equal to about 600° C. to less than or equal to about 900° C.

In one aspect, the method may further include annealing by heating the precursor layer and the substrate to a temperature ranging from greater than or equal to about 900° C. to less than or equal to about 1,300° C.

In one aspect, heating is localized and applied using one of ultrasonic and microwave heating techniques.

In one aspect, the precursor layer may be disposed onto a surface of the substrate by solvent-casting.

In one aspect, the metallic substrate may include copper, nickel, or alloys thereof and the substrate may be in the form of one of a woven mesh and a silt foil.

In one aspect, the solvent may be selected from the group consisting of: N-methyl-2-pyrrolidone (NMP), methanol, ethanol, isopropanol, water, and combinations thereof.

In one aspect, the silicon-containing electroactive material may include one or more a nano-sized particles having an average diameter ranging from greater than or equal to about 100 nm to less than or equal to about 500 nm and micron-sized particles having an average diameter ranging from greater than or equal to about 1 μm to less than or equal to about 5 μm.

In one aspect, the silicon-containing electroactive material may be in the form of a plurality of particles having an average diameter ranging from greater than or equal to about 100 nm to less than or equal to about 10 μm.

In one aspect, the nitrogen-containing carbon coating may have an average thickness that ranges from greater than or equal to about 2 nm to less than or equal to about 40 nm.

In one aspect, the precursor layer may further include an electronically conducting material selected from the group consisting of carbon fibers, carbon nanotubes, carbon black, graphite particles, graphene sheet, and combinations thereof In one aspect, the polymeric-binder-free electrode may further include from greater than or equal to about 1 wt. % to less than or equal to about 20 wt. % of a filamentary copper dispersed therewithin.

In one aspect, the precursor layer may further include a matrix precursor and the heating forms an electrically conductive carbonaceous matrix. The coated silicon-containing electroactive materials may be dispersed throughout the electrically conductive carbonaceous matrix to form the polymeric-binder-free electrode.

In yet other aspects, the present disclosure provides a composite electrode for use in an electrochemical cell that cycles lithium ions. The composite electrode may include a plurality of particles dispersed within a carbonaceous matrix. The plurality of particles may include a silicon-containing electroactive material having a nitrogen-containing carbon coating disposed thereon, one or more electronically conducting materials, and a plurality of copper filaments.

In one aspect, the silicon-containing electroactive material may be in the form of a plurality of particles having an average diameter ranging from greater than or equal to about 50 nm to less than or equal to about 10 μm.

In one aspect, the nitrogen-containing carbon coating may have an average thickness ranging from greater than or equal to about 2 nm to less than or equal to about 40 nm.

In one aspect, the nitrogen-containing carbon coating may be a derivative of one or more nitrogen-containing precursor materials. The nitrogen-containing precursor material may be selected from the group consisting of: melamine, cyanuric acid, nicotine, 1,10-phenanthroline, carbazole, adenine, guanine, dopamine, branched or linear poly(ethyleneimine), poly(4-vinylpyridine), poly(3,5-pyridine), poly(4-vinylpyridine-co-divinylbenzene), poly(4-vinylpyridine-co-styrene), poly(melamine-co-formaldehyde), polypyrrole, polyaniline, and combinations thereof In one aspect, the one or more electronically conducting material may be selected from the group consisting of carbon fibers, carbon nanotubes, carbon black, graphite particles, graphene sheet, and combinations thereof.

In one aspect, the composite electrode may include greater than or equal to about 5 wt. % to less than or equal to about 25 wt. % of the electronically conducting material.

In one aspect, the composite electrode may include from greater than or equal to about 1 wt. % to less than or equal to about 20 wt. % of a filamentary copper dispersed therewithin.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
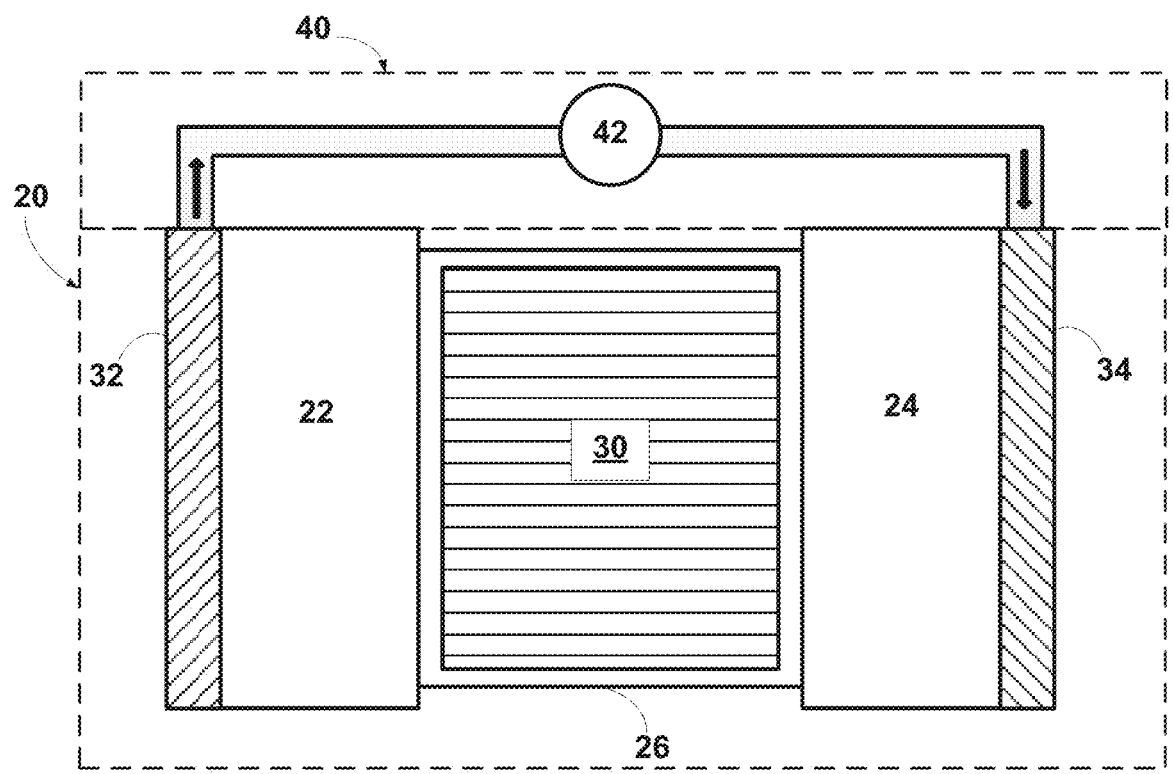
FIG. 1 is a schematic of an example electrochemical battery cell.

Example embodiments are provided so that this disclosure will be thorough, and will fully convey the scope to those who are skilled in the art. Numerous specific details are set forth such as examples of specific compositions, components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, elements, compositions, steps, integers, operations, and/or components, but do not preclude the presence or addition of one or more other features, integers, steps, operations, elements, components, and/or groups thereof. Although the open-ended term "comprising," is to be understood as a non-restrictive term used to describe and claim various embodiments set forth herein, in certain aspects, the term may alternatively be understood to instead be a more limiting and restrictive term, such as "consisting of" or "consisting essentially of." Thus, for any given embodiment reciting compositions, materials, components, elements, features, integers, operations, and/or process steps, the present disclosure also specifically includes embodiments consisting of, or consisting essentially of, such recited compositions, materials, components, elements, features, integers, operations, and/or process steps. In the case of "consisting of" the alternative embodiment excludes any additional compositions, materials, components, elements, features, integers, operations, and/or process steps, while in the case of "consisting essentially of," any additional compositions, materials, components, elements, features, integers, operations, and/or process steps that materially affect the basic and novel characteristics are excluded from such an embodiment, but any compositions, materials, components, elements, features, integers, operations, and/or process steps that do not materially affect the basic and novel characteristics can be included in the embodiment.

Any method steps, processes, and operations described herein are not to be construed as necessarily requiring their performance in the particular order discussed or illustrated, unless specifically identified as an order of performance. It is also to be understood that additional or alternative steps may be employed, unless otherwise indicated.

When a component, element, or layer is referred to as being "on," "engaged to," "connected to," or "coupled to" another element or layer, it may be directly on, engaged, connected or coupled to the other component, element, or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various steps, elements, components, regions, layers and/or sections, these steps, elements, components, regions, layers and/or sections should not be limited by these terms, unless otherwise indicated. These terms may be only used to distinguish one step, element, component, region, layer or section from another step, element, component, region, layer or section. Terms such as "first," "second," and other numerical terms when used herein do not imply a sequence or order unless clearly indicated by the context. Thus, a first step, element, component, region, layer or section discussed below could be termed a second step, element, component, region, layer or section without departing from the teachings of the example embodiments.

Spatially or temporally relative terms, such as "before," "after," "inner," "outer," "beneath," "below," "lower," "above," "upper," and the like, may be used herein for ease of description to describe one element or feature's relationship to another element(s) or feature(s) as illustrated in the figures. Spatially or temporally relative terms may be intended to encompass different orientations of the device or system in use or operation in addition to the orientation depicted in the figures.

Throughout this disclosure, the numerical values represent approximate measures or limits to ranges to encompass minor deviations from the given values and embodiments having about the value mentioned as well as those having exactly the value mentioned. Other than in the working examples provided at the end of the detailed description, all numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. For example, "about" may comprise a variation of less than or equal to 5%, optionally less than or equal to 4%, optionally less than or equal to 3%, optionally less than or equal to 2%, optionally less than or equal to 1%, optionally less than or equal to 0.5%, and in certain aspects, optionally less than or equal to 0.1%.

In addition, disclosure of ranges includes disclosure of all values and further divided ranges within the entire range, including endpoints and sub-ranges given for the ranges.

Example embodiments will now be described more fully with reference to the accompanying drawings.

The present technology pertains to improved electrochemical cells, especially lithium-ion batteries. In various instances, such cells are used in automotive transportation applications. However, the present technology may be employed in a wide variety of other applications.

An exemplary and schematic illustration of an electrochemical cell (also referred to as the battery) that cycles lithium ions is shown in FIG. 1. The battery 20 includes a negative electrode 22, a positive electrode 24, and a separator 26 (e.g., a microporous polymeric separator) disposed between the two electrodes 22, 24. The separator 26 comprises an electrolyte 30, which may also be present in the negative electrode 22 and positive electrode 24. A negative electrode current collector 32 may be positioned at or near the negative electrode 22 and a positive electrode current collector 34 may be positioned at or near the positive electrode 24. The negative electrode current collector 32 and positive electrode current collector 34 respectively collect and move free electrons to and from an external circuit 40. An interruptible external circuit 40 and load 42 connects the negative electrode 22 (through its current collector 32) and the positive electrode 24 (through its current collector 34).

The battery 20 can generate an electric current during discharge by way of reversible electrochemical reactions that occur when the external circuit 40 is closed (to connect the negative electrode 22 and the positive electrode 24) and the negative electrode 22 contains a relatively greater quantity of lithium than the positive electrode. The chemical potential difference between the positive electrode 24 and the negative electrode 22 drives electrons produced by the oxidation of intercalated lithium at the negative electrode 22 through the external circuit 40 toward the positive electrode 24. Lithium ions, which are also produced at the negative electrode, are concurrently transferred through the electrolyte solution 30 contained in the separator 26 towards the positive electrode 24. The electrons flow through the external circuit 40 and the lithium ions migrate across the separator 26 containing the electrolyte solution 30 to form intercalated lithium at the positive electrode 24. The electric current passing through the external circuit 40 can be harnessed and directed through the load device 42 until the intercalated lithium in the negative electrode 22 is depleted and the capacity of the battery 20 is diminished.

The battery 20 can be charged or re-energized at any time by connecting an external power source to the lithium ion battery 20 to reverse the electrochemical reactions that occur during battery discharge. The connection of an external electrical energy source to the battery 20 compels the otherwise non-spontaneous oxidation of intercalated lithium at the negative electrode 22 to produce electrons and lithium ions. The electrons, which flow back towards the positive electrode 24 through the external circuit 40, and the lithium ions, which are carried by the electrolyte solution 30 across the separator 26 back towards the positive electrode 24, reunite at the positive electrode 24 and replenish it with intercalated lithium for use during the next battery discharge event. As such, a complete discharging event followed by a complete charging event is considered to be a cycle, where lithium ions are cycled between the positive electrode 24 and the negative electrode 22. The external power source that may be used to charge the battery 20 may vary depending on the size, construction, and particular end-use of the battery 20. Some notable and exemplary external power sources include, but are not limited to, an AC-DC converter connected to an AC electrical power grid though a wall outlet and a motor vehicle alternator.

In many lithium-ion battery configurations, each of the negative current collector 32, negative electrode 22, the separator 26, positive electrode 24, and positive electrode current collector 34 are prepared as relatively thin layers (for example, from several microns to a fraction of a millimeter or less in thickness) and assembled in layers connected in electrical parallel arrangement to provide a suitable electrical energy and power package. Further, the separator 26 operates as an electrical insulator by being sandwiched between the negative electrode 22 and the positive electrode 24 to prevent physical contact and thus, the occurrence of a short circuit. The separator 26, in addition to providing a physical barrier between the two electrodes 22, 24, acts like a sponge that contains the electrolyte solution in a network of open pores during the cycling of lithium ions, to facilitate functioning of the battery 20.

Furthermore, the battery 20 can include a variety of other components that while not depicted here are nonetheless known to those of skill in the art. For instance, the battery 20 may include a casing, gaskets, terminal caps, tabs, battery terminals, and any other conventional components or materials that may be situated within the battery 20, including between or around the negative electrode 22, the positive electrode 24, and/or the separator 26. As noted above, the size and shape of the battery 20 may vary depending on the particular application for which it is designed. Battery-powered vehicles and hand-held consumer electronic devices, for example, are two examples where the battery 20 would most likely be designed to different size, capacity, and power-output specifications. The battery 20 may also be connected in series or parallel with other similar lithium-ion cells or batteries to produce a greater voltage output, energy, and power if it is required by the load device 42.

Accordingly, the battery 20 can generate electric current to a load device 42 that is part of the external circuit 40. The load device 42 may be powered by the electric current passing through the external circuit 40 when the battery 20 is discharging. While the electrical load device 42 may be any number of known electrically-powered devices, a few specific examples include an electric motor for an electrified vehicle, a laptop computer, a tablet computer, a cellular phone, and cordless power tools or appliances. The load device 42 may also be an electricity-generating apparatus that charges the battery 20 for purposes of storing electrical energy.

With renewed reference to FIG. 1, the positive electrode 24, the negative electrode 22, and the separator 26 may each include an electrolyte solution or system 30 inside their pores, capable of conducting lithium ions between the negative electrode 22 and the positive electrode 24. The electrolyte system 30 may have a viscosity ranging from about 5 mPa·s to about 50 mPa·s. In certain aspects, the electrolyte 30 may be a non-aqueous liquid electrolyte solution that includes one or more lithium salts dissolved in an organic solvent or a mixture of organic solvents. Numerous aprotic non-aqueous liquid electrolyte solutions may be employed in the lithium-ion battery 20.

For example, a non-limiting list of lithium salts that may be dissolved in an organic solvent to form the non-aqueous liquid electrolyte solution include lithium hexafluorophosphate ($LiPF_6$), lithium perchlorate ($LiClO_4$), lithium tetrachloroaluminate ($LiAlCl_4$), lithium iodide (LiI), lithium bromide (LiBr), lithium thiocyanate (LiSCN), lithium tetrafluoroborate ($LiBF_4$), lithium tetraphenylborate ($LiB(C_6H_5)_4$), lithium bis(oxalato)borate ($LiB(C_2O_4)_2$) (LiBOB), lithium difluorooxalatoborate ($LiBF_2(C_2O_4)$), lithium hexafluoroarsenate ($LiAsF_6$), lithium trifluoromethanesulfonate ($LiCF_3SO_3$), lithium bis(trifluoromethane) sulfonylimide ($LiN(CF_3SO_2)_2$), lithium bis(fluorosulfonyl) imide ($LiN(FSO_2)_2$) (LiSFI), and combinations thereof These and other similar lithium salts may be dissolved in a variety of aprotic organic solvents, including but not limited to, various alkyl carbonates, such as cyclic carbonates (e.g., ethylene carbonate (EC), propylene carbonate (PC), butylene carbonate (BC), fluoroethylene carbonate (FEC)), linear carbonates (e.g., dimethyl carbonate (DMC), diethyl carbonate (DEC), ethylmethylcarbonate (EMC)), aliphatic carboxylic esters (e.g., methyl formate, methyl acetate, methyl propionate), γ-lactones (e.g., γ-butyrolactone, γ-valerolactone), chain structure ethers (e.g., 1,2-dimethoxyethane, 1-2-diethoxyethane, ethoxymethoxyethane), cyclic ethers (e.g., tetrahydrofuran, 2-methyltetrahydrofuran), 1,3-dioxolane), sulfur compounds (e.g., sulfolane), and combinations thereof.

The porous separator 26 may include, in certain instances, a microporous polymeric separator including a polyolefin. The polyolefin may be a homopolymer (derived from a single monomer constituent) or a heteropolymer (derived from more than one monomer constituent), which may be either linear or branched. If a heteropolymer is derived from two monomer constituents, the polyolefin may assume any copolymer chain arrangement, including those of a block copolymer or a random copolymer. Similarly, if the polyolefin is a heteropolymer derived from more than two monomer constituents, it may likewise be a block copolymer or a random copolymer. In certain aspects, the polyolefin may be polyethylene (PE), polypropylene (PP), or a blend of PE and PP, or multi-layered structured porous films of PE and/or PP. Commercially available polyolefin porous membranes 26 include CELGARD® 2500 (a monolayer polypropylene separator) and CELGARD® 2320 (a trilayer polypropylene/polyethylene/polypropylene separator) available from Celgard LLC.

In certain aspects, the separator 26 may further include one or more of a ceramic coating layer and a heat-resistant material coating. The ceramic coating layer and/or the heat-resistant material coating may be disposed on one or more sides of the separator 26. The material forming the ceramic layer may be selected from the group consisting of: alumina ($Al_2O_3$), silica ($SiO_2$), and combinations thereof. The heat-resistant material may be selected from the group consisting of: Nomex, Aramid, and combinations thereof.

When the separator 26 is a microporous polymeric separator, it may be a single layer or a multi-layer laminate, which may be fabricated from either a dry or wet process. For example, in certain instances, a single layer of the polyolefin may form the entire separator 26. In other aspects, the separator 26 may be a fibrous membrane having an abundance of pores extending between the opposing surfaces and may have an average thickness of less than a millimeter, for example. As another example, however, multiple discrete layers of similar or dissimilar polyolefins may be assembled to form the microporous polymer separator 26. The separator 26 may also comprise other polymers in addition to the polyolefin such as, but not limited to, polyethylene terephthalate (PET), polyvinylidene fluoride (PVDF), a polyamide, polyimide, poly(amide-imide) copolymer, polyetherimide, and/or cellulose, or any other material suitable for creating the required porous structure. The polyolefin layer, and any other optional polymer layers, may further be included in the separator 26 as a fibrous layer to help provide the separator 26 with appropriate structural and porosity characteristics. In certain aspects, the separator 26 may also be mixed with a ceramic material or its surface may be coated in a ceramic material. For example, a ceramic coating may include alumina ($Al_2O_3$), silicon dioxide ($SiO_2$), titania ($TiO_2$) or combinations thereof. Various conventionally available polymers and commercial products for forming the separator 26 are contemplated, as well as the many manufacturing methods that may be employed to produce such a microporous polymer separator 26.

The positive electrode 24 may be formed from a lithium-based active material that can sufficiently undergo lithium intercalation and deintercalation, or alloying and dealloying, while functioning as the positive terminal of the battery 20. One exemplary common class of known materials that can be used to form the positive electrode 24 is layered lithium transitional metal oxides. For example, in certain aspects, the positive electrode 24 may comprise one or more materials having a spinel structure, such as lithium manganese oxide ($Li_{(1+x)}Mn_2O_4$, where $0.1 \leq x \leq 1$), lithium manganese nickel oxide ($LiMn_{(2-x)}Ni_xO_4$, where $0 \leq x \leq 0.5$) (e.g., $LiMn_{1.5}Ni_{0.5}O_4$); one or more materials with a layered structure, such as lithium cobalt oxide ($LiCoO_2$), lithium nickel manganese cobalt oxide ($Li(Ni_xMn_yCo_z)O_2$, where $0 \leq x \leq 1$, $0 \leq y \leq 1$, $0 \leq z \leq 1$, and $x+y+z=1$) (e.g., $LiMn_{0.33}Ni_{0.33}Co_{0.33}O_2$), or a lithium nickel cobalt metal oxide ($LiNi_{(1-x-y)}Co_xM_yO_2$, where $0<x<0.2$, $y<0.2$, and M may be Al, Mg, Ti, or the like); or a lithium iron polyanion oxide with olivine structure, such as lithium iron phosphate ($LiFePO_4$), lithium manganese -iron phosphate ($LiMn_{2-x}Fe_xPO_4$, where $0<x<0.3$), or lithium iron fluorophosphate ($Li_2FePO_4F$).

In certain variations, the positive active materials may be intermingled with an electronically conducting material that provides an electron conduction path and/or at least one polymeric binder material that improves the structural integrity of the electrode. For example, the active materials and electronically conducting materials may be slurry cast with such binders, like polyvinylidene difluoride (PVdF), polytetrafluoroethylene (PTFE), ethylene propylene diene monomer (EPDM) rubber, or carboxymethyl cellulose (CMC), a nitrile butadiene rubber (NBR), styrene-butadiene rubber (SBR), lithium polyacrylate (LiPAA), sodium polyacrylate (NaPAA), sodium alginate, lithium alginate. Electronically conducting materials may include carbon-based materials, powdered nickel or other metal particles, or a conductive polymer. Carbon-based materials may include, for example, particles of graphite, acetylene black (such as KETCHEN™ black or DENKA™ black), carbon fibers and nanotubes, graphene, and the like. Examples of a conductive polymer include polyaniline, polythiophene, polyacetylene, polypyrrole, and the like. In certain aspects, mixtures of the conductive materials may be used. The positive electrode current collector 34 may be formed from aluminum (Al) or any other appropriate electrically conductive material known to those of skill in the art.

Figure 2:
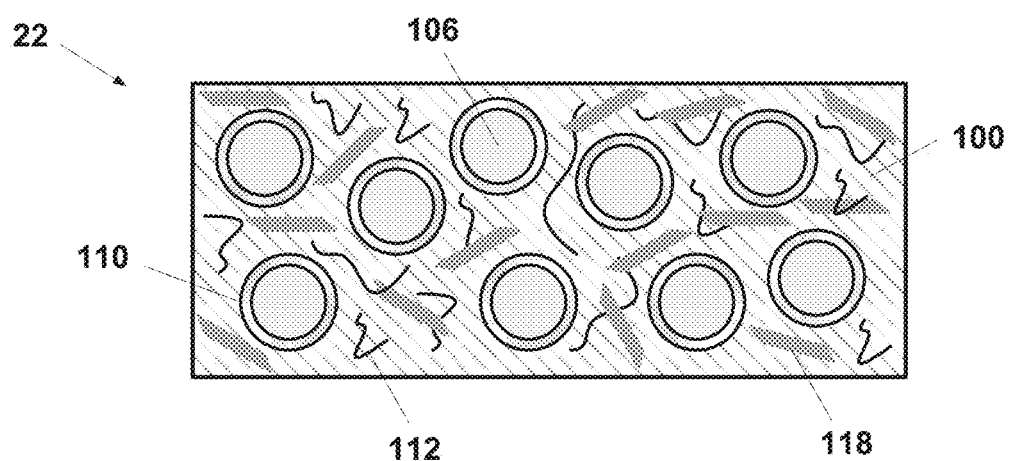
FIG. 2 is an illustration of a composite electrode comprising a porous carbonaceous matrix, a plurality of electroactive particles, and filamentary copper.

The negative electrode 22 includes an electroactive material as a lithium host material capable of functioning as a negative terminal of a lithium ion battery. As illustrated in FIG. 2, the negative electrode 22 may be a composite electrode comprising a porous matrix 100 and a plurality of electroactive particles 106 dispersed therein. In various variations, the porous matrix 100 may comprise one or more purely polymeric materials and, in certain aspects, the porous matrix 100 may also comprise or be formed of a carbonized material, which may be some form of amorphous, partially graphitized or graphitic carbon that is electrically conductive. In certain variations, one or more electronically conducting materials 112 and/or filamentary copper 118 may be dispersed within the plurality of electroactive particles 106 throughout the porous matrix 100. Thus, in certain aspects, the porous matrix 100 may itself be electrically conductive, for example, when the porous matrix 100 is formed of a carbonized material. Such a porous matrix 100 may further be a nitrogen-doped carbonized material. In certain aspects, the electrically conductive carbonaceous matrix may further include electronically conducting materials 112 and/or filamentary copper 118. In certain aspects, however, the porous matrix 100, such as when the porous matrix 100 is formed of a polymeric material, may be rendered conductive by the inclusion of the electronically conducting materials 112 and/or filamentary copper 118.

In various instances, the negative electrode 22 may include greater than or equal to about 5 wt. % to less than or equal to about 20 wt. %, and in certain aspects, optionally from greater than or equal to about 10 wt. % to less than or equal to about 15 wt. % of the porous matrix 100. The negative electrode 22 may include greater than or equal to about 50 wt. % to less than or equal to about 90 wt. %, and in certain aspects, optionally from greater than or equal to about 60 wt. % to less than or equal to about 80 wt. % of the electroactive particles 106. The negative electrode 22 may include greater than or equal to about 5 wt. % to less than or equal to about 25 wt. %, and in certain aspects, optionally from greater than or equal to about 10 wt. % to less than or equal to about 15 wt. % of the electronically conducting material 112. The negative electrode 22 may include greater than or equal to about 1 wt. % to less than or equal to about 20 wt. %, and in certain aspects, optionally from greater than or equal to about 5 wt. % to less than or equal to about 10 wt. % of the filamentary or dendritic copper 118. The negative electrode 22 is substantially free of a polymeric binder.

The electroactive particles 106 dispersed within the porous matrix 100 may comprise one or more electroactive materials selected from the group consisting of: silicon, silicon oxides, silicon-containing alloys, tin, tin-containing, and combinations thereof. By way of non-limiting examples, electroactive particles 106 comprising silicon may include silicon that may have a particle size ranging from greater than or equal to about 50 nm to less than or equal to about 10 μm and average particle sizes (D50) ranging from greater than or equal to about 150 nm to less than or equal to about 5 μm. The plurality of electroactive particles 106 is capable of accepting the insertion of lithium ions during charging of the electrochemical cell ("alloying") and releasing lithium ions during discharging of the electrochemical cell ("dealloying").

In various aspects, each electroactive particle 106 of the plurality may have an average particle diameter that ranges from greater than or equal to about 250 nm to less than or equal to about 20 μm, optionally from greater than or equal to about 150 nm to less than or equal to about 20 μm, optionally from greater than or equal to about 50 nm to less than or equal to about 20 μm, and in certain aspects, optionally from greater than or equal to about 50 nm to less than or equal to about 5 μm. In certain variations, each electroactive particle 106 of the plurality dispersed within the porous matrix 100 (e.g., carbonaceous matrix) may have a nitrogen-containing carbon coating 110 disposed on exposed surfaces of the electroactive particle 106. The porous matrix 100 may form a plurality of anchoring points for the coated or uncoated electroactive particles 106. When present, the porous matrix 100 may also additionally provide contact or anchor points for the electronically conducting materials 112 and/or filamentary copper 118.

In certain aspects, the coating 110 may have an average thickness that is about 1% of an average diameter of the electroactive particle 106. In various instances, the coating 110 may have an average thickness that ranges from greater than or equal to about 2 nm to less than or equal to about 20 nm, and in certain aspects, optionally from greater than or equal to about 5 nm to less than or equal to about 20 nm. The coating 110 may be substantially continuous such that less than or equal to about 10%, optionally less than or equal to about 5%, and in certain aspects, less than or equal to about 2% of the surface area of the exposed surfaces of the electroactive particle 106 remains exposed and/or available to interact with the materials comprising the porous matrix 100.

The coating 110 comprises a nitrogen-carbon framework comprising one or more nitrogen-carbon bonds that binds to the electroactive particle 106. In various aspects, the nitrogen-carbon framework may be a derivative of one or more nitrogen-containing precursor materials selected from the group consisting of melamine, cyanuric acid, nicotine, 1,10-phenanthroline, carbazole, adenine, guanine, dopamine, branched or linear poly(ethyleneimine), poly(4-vinylpyridine), poly(3,5-pyridine), poly(4-vinylpyridine-co-divinylbenzene), poly(4-vinylpyridine-co-styrene), poly(melamine-co-formaldehyde), polypyrrole, polyaniline, and combinations thereof. The nitrogen of the one or more nitrogen-carbon may bond with electroactive particle 106. In addition, the nitrogen of the one or more nitrogen-carbon bonds in some of these compounds may bind with the silicon in a silicon-containing electroactive particle to form a —$C_2$=N—Si coating layer on the electroactive particle. In certain aspects, the coating 110 provides a protective film—for example, an artificial protective solid-electrolyte interface (SEI)—that prevents the decomposition of electrolyte solution components (for example, including both the solvents and anions) at the electroactive materials, while at the same time being electronically insulating and lithium-ion conducting. As such, the coating 110 may prevent or minimize the decomposition of the electrolyte 30 during cycling of the electrochemical cell 20, while facilitating the lithium ion transport.

In various instances, as noted above, the negative electrode 22 may include one or more electronically conducting materials or carbon fillers 112 that are dispersed throughout the porous matrix 100 and in contact with the electroactive particles 106. More specifically, the carbonaceous matrix 100 may provide a plurality of contacting or anchor points for the electronically conducting material 112 onto the electroactive material 106. The one or more electronically conducting materials 112 may be selected from the group consisting of: carbon fibers, carbon nanotubes, carbon black, graphite particles, graphene sheets, dendritic copper, copper nanofilaments, dendritic nickel, nickel nanofilaments, and combination thereof. The carbonaceous matrix may retain the anchor points between respective materials during the expansion and contraction cycles of the electroactive particles. The negative electrode 22 may include greater than or equal to about 5 wt. % to less than or equal to about 25 wt. %, and in certain aspects, optionally from greater than or equal to about 10 wt. % to less than or equal to about 15 wt. % of the electronically conducting material 112.

In certain aspects, the electronically conducting material 112 may be in a fiber form that comprises a mixture of two electronically conducting materials. The first electronically conducting material comprising, for example, vapor-grown carbon fibers and/or graphene sheets, may have a stiffness that is greater than the second electronically conducting material so to provide mechanical resilience to the electrode structure during the electrochemical cycling of the battery. The second electronically conducting material comprising, for example, single-wall carbon nanotubes (SWCNTs), may have greater flexibility than the first electronically conducting material, so to provide multiple contact points with the electroactive particles 106 and ensuring electronic contact between the electroactive particles 106 and a tab of the negative electrode 22, including after cracking within the battery 20. In certain aspects, the electronically conducting material 112 may comprise a third electronically conducting material. For example, in such instances, the third electronically conducting material may comprise graphite particles. Such graphite particles may act as a lubricant so to minimize friction between the electroactive particles 106 and electronically conducting material 112 during electrochemical cycling of the battery 20.

In various instances, as noted above, the negative electrode 22 may include dendritic or filamentary copper 118. The filamentary copper 118 in the form of a plurality of nanofibers, microfibers, or dendritic trees may be dispersed throughout the porous matrix 100 with the electroactive particles 106 and electronically conducting materials 112. As such, the filamentary copper 118 may improve or maximize the electronic conductivity and thus the charging and discharging rate of the negative electrode 22. More particularly, the filamentary copper 118 may create low-resistance electrical contacts (for example, in-situ formed copper silicide ($Cu_3Si$) intermetallic electronically conductive "welds") between the electroactive particles 106 and the current collector. In certain aspects, the filamentary copper 118 forms a network that is intertwined with and coexists with the porous carbonaceous matrix 100. The negative electrode 22 may include greater than or equal to about 1 wt. % to less than or equal to about 20 wt. %, and in certain aspects, optionally from greater than or equal to about 5 wt. % to less than or equal to about 10 wt. % of the filamentary or dendritic copper 118.

The negative electrode current collector 32 may comprise a metal comprising copper, nickel, or alloys thereof. For example, in certain aspects, the negative electrode current collector 32 may comprise copper in the form of a copper foil, slit mesh, and/or woven mesh.

A method of making a composite electrode material (e.g., coated electroactive material) for use in a lithium-ion battery is also provided. In various aspects, the method includes contacting or mixing an electroactive material that comprises silicon, a silicon-containing alloy, or a combination thereof and one or more nitrogen-containing precursors. In certain aspects, an acidic pre-treat (such as, hydrofluoric acid in and aqueous solution) may be applied to the electroactive material before the electroactive material is added to the mixture. In this matter the preparatory acid treatment may reduce any oxides (e.g., $SiO_2$) that may be present on the surface of the electroactive material and/or increase porosity of the electroactive material so to improve subsequent bonding (for example, of a coating) to the surface of the electroactive material.

The one or more nitrogen-containing precursors (i.e., nitrogen-containing molecular compounds or polymeric precursors) comprise one or more nitrogen-carbon bonds. In various variations, the one or more nitrogen-containing precursors may be selected from the group consisting of melamine, cyanuric acid, nicotine, 1,10-phenanthroline, carbazole, adenine, guanine, dopamine, branched or linear poly(ethyleneimine), poly(4-vinylpyridine), poly(3,5-pyridine), poly(4-vinylpyridine-co-divinylbenzene), poly(4-vinylpyridine-co-styrene), poly(melamine-co-formaldehyde), polypyrrole, polyaniline, and combinations thereof. The nitrogen-containing precursors have low oxygen contents or are oxygen free. The selection of such precursors may minimize or prevent undesirable oxidation of the silicon during high-temperature carbonization and annealing processes at temperatures ranging from greater than or equal to about 400° C. to less than or equal to about 1,300° C. In certain aspects, the mixture may further include a solvent be selected from the group consisting of: N-methyl-2-pyrrolidone (NMP), methanol, ethanol, isopropanol, water, and combinations thereof.

In certain instances, the method further comprises heating the mixture of the electroactive material and the one or more nitrogen-containing precursor materials to a temperature ranging from greater than or equal to about 200° C. to less than or equal to about 1,300° C., optionally from greater than or equal to about 400° C. to less than or equal to about 1,300° C., and in certain aspects, optionally from greater than or equal to about 600° C. to less than or equal to about 1,200° C. In certain variations, the heating may be conducted for a duration ranging from greater than or equal to about 1 hour to less than or equal to about 24 hours, optionally greater than or equal to about 1 hour to less than or equal to about 6 hours, optionally greater than or equal to about 1 hour to less than or equal to about 4 hours, and in certain aspects, optionally greater than or equal to about 1 hour to less than or equal to about 2 hours. The duration of the heating may be selected to accommodate the selected batch size. While the heating and method may be performed under atmospheric conditions (e.g., in air), in certain aspects, the method is performed in an inert environment (under inert atmosphere (e.g., $N_2$ or Ar)), a reducing environment (under a reducing environment, (e.g., in an $Ar/H_2$ or Ar/CO gas mixture)), or in a vacuum (lower than atmospheric pressure) to minimize or prevent undesirable oxidation of the silicon and to achieve the C-N-Si coating layer on the surface of the silicon particles.

Heating the mixture of the electroactive material and the one or more nitrogen-containing precursor materials causes the formation of a nitrogen-containing carbon coating on exposed surfaces of the silicon-containing electroactive material. More particularly, heating the mixture causes dehydrogenation (e.g., greater than about 90%) of the nitrogen-containing precursor materials. In a dehydrogenated state, the nitrogen-containing precursor polymer is substantially void of hydrogen and comprises a carbon-nitrogen framework which binds with the silicon of the silicon-containing electroactive material to form the nitrogen-containing carbon coating. In certain aspects, the nitrogen of the one or more nitrogen-carbon bonds of the carbon-nitrogen framework bonds with the silicon of the silicon-containing electroactive material.

In various variations, after heating the mixture of the electroactive material and the one or more nitrogen-containing precursors (and in certain aspects, also the electronically conducting materials and filamentary carbon) to a temperature ranging from greater than or equal to about 400° C. to less than or equal to about 1300° C. for a duration of greater than or equal to about 1 hour to less than or equal to about 6 hours, the method may further include pyrolyzing by heating the mixture to a temperature ranging from greater than or equal to about 500° C. to less than or equal to about 1,300° C., optionally from greater than or equal to about 600° C. to less than or equal to about 1,300° C., optionally from greater than or equal to about 900° C. to less than or equal to about 1,300° C., and in certain aspects, optionally from greater than or equal to about 900° C. to less than or equal to about 1,200° C. In certain variations, the pyrolysis may occur for a duration of greater than or equal to about 30 minutes to less than or equal to about 24 hours, and in certain aspects, optionally from greater than or equal to about 1 hour to less than or equal to about 4 hours. The duration of the pyrolysis may be selected to accommodate the selected batch size.

In certain other instances, the nitrogen-containing carbon coating on exposed surfaces of the silicon-containing electroactive material may be formed using a vapor phase deposition process. In such instances, a vapor of the nitrogen-containing precursor material (e.g., pyridine, vinyl pyridine) in a carrier gas, such as, nitrogen or argon, may be carbonized at temperatures ranging from greater than or equal to about 400° C. to less than or equal to about 1000° C. The vapor of the nitrogen-containing precursor material is carried over the silicon-containing electroactive material in one of a packed bed or a fluidized bed reaction that operates at the high temperatures. The carbonization process may have a duration ranging from greater than or equal to about 30 minutes to less than or equal to about 6 hours, and in certain aspects, optionally from greater than or equal to about 30 minutes to less than or equal to about 1 hours. The duration may dependent on the concentration of the nitrogen-containing precursor material in the carrier gas and the gas flow rate.

In certain other instances, the nitrogen-containing carbon coating on exposed surfaces of the silicon-containing electroactive material may be formed using a sonochemical deposition process. In such instances, a silicon powder is placed into a reaction vessel filled with a suitable liquid mixed with the nitrogen-containing precursor material (e.g., vinylpyridine, melamine, cyanuric acid, adenine, nicotine, 1,10-phenanthroline, carbazole, adenine, guanine, or dopamine). The suitable liquid may be one or more hydrocarbons having a comparatively high boiling point, such as decane, dodecane, hexadecane, pure pyridine, and combinations thereof. Applying ultrasound to the reaction vessel, nitrogen gas is bubbled through the reaction medium under anaerobic conditions and the nitrogen-containing carbon coating is formed.

A method of making a polymeric-binder-free composite electrode for use in a lithium-ion battery is also provided. In various aspects, the method includes disposing a precursor layer onto at least a select region of a surface of a metallic substrate to form the binder-free electrode. In various variations, the precursor layer may be disposed onto a copper or nickel substrate. The substrate may be a woven mesh or a slit foil. The precursor layer comprises an electroactive material, one or more nitrogen-containing precursors, and a solvent. For example, the precursor layer may comprise greater than or equal to about 40 wt. % to less than or equal to about 90 wt. %, optionally greater than or equal to about 60 wt. % to less than or equal to about 80 wt. %, of the electroactive material; and greater than or equal to about 5 wt. % to less than or equal to about 25 wt. %, optionally greater than or equal to about 10 wt. % to less than or equal to about 20 wt. %, of the one or more nitrogen-containing precursors. The solvent may be selected from the group consisting of: N-methyl-2-pyrrolidone (NMP), methanol, ethanol, isopropanol, water, and combinations thereof.

In certain aspects, the precursor layer may further include one or more electronically conducting materials. For example, the precursor layer may include greater than or equal to about 5 wt. % to less than or equal to about 25 wt. %, optionally greater than or equal to about 10 wt. % to less than or equal to about 20 wt. %, of the one or more electronically conducting materials. The electronically conducting material may be selected from the group consisting of carbon fibers, carbon nanotubes, carbon black, graphite particles, graphene sheet, and combination thereof. The electronically conductive material may offer further flexibility during the manufacturing of the polymeric-binder-free electrode. In certain instances, the electronically conducting material may also improve or increase electrical contacts between the electroactive particles and the current collector and/or improve the mechanical resilience of the electrode structure.

In certain aspects, the electroactive material may be selected from the group consisting of: silicon, silicon oxide, silicon-containing alloys, tin, tin-containing alloys, and combinations thereof. The electroactive material may comprise one or more nano-sized particles having an average diameter ranging from greater than or equal to about 100 nm to less than or equal to about 500 nm and micron-sized particles having an average diameter ranging from greater than or equal to about 1 μm to less than or equal to about 5 μm. In various variations, the one or more nitrogen-containing precursors may be selected from the group consisting of melamine, cyanuric acid, nicotine, 1,10-phenanthroline, carbazole, adenine, guanine, dopamine, branched or linear poly(ethyleneimine), poly(4-vinylpyridine), poly(3,5-pyridine), poly(4-vinylpyridine-co-divinylbenzene), poly(4-vinylpyridine-co-styrene), poly(melamine-co-formaldehyde), polypyrrole, polyaniline, and combinations thereof. The selection of precursors that have low oxygen contents or that are oxygen-free may minimize or prevent undesirable oxidation of the silicon during the processing of the electrode precursor at high temperatures. In various variations, in addition to providing an electronic conduction path in the electrode, subsequent to carbonization, the nitrogen-containing precursors may also create multiple anchoring points for the electronically conducting material onto the active material, that persist throughout the electrode after the carbonization process of the nitrogen-containing precursor.

The precursor layer may be disposed onto the substrate using any standard method for making a composite electrode, such as solvent-casting. The method further comprises heating at least a select region of the precursor layer and the substrate using a localized heating method to a temperature ranging from greater than or equal to about 200° C. to less than or equal to about 1,300° C., optionally from greater than or equal to about 400° C. to less than or equal to about 1,300° C., and in certain aspects, optionally from greater than or equal to about 600° C. to less than or equal to about 1,200° C. In certain variations, the heating may be conducted for a duration ranging from greater than or equal to about 1 hour to less than or equal to about 24 hours, optionally greater than or equal to about 1 hour to less than or equal to about 6 hours, optionally greater than or equal to about 1 hour to less than or equal to about 4 hours, and in certain aspects, optionally greater than or equal to about 1 hour to less than or equal to about 2 hours. The duration of the heating may be selected to accommodate the elected batch size.

Heating the mixture of the silicon-containing electroactive material and the precursor layer causes the formation of a nitrogen-containing carbon coating on exposed surfaces of the silicon-containing electroactive material. More particularly, heating the mixture causes dehydrogenation of the nitrogen-containing precursor materials. In a dehydrogenated state, the nitrogen-containing precursor polymer is substantially void of hydrogen and comprises a carbon-nitrogen framework which binds with the silicon of the silicon-containing electroactive material to form the nitrogen-containing carbon coating. The nitrogen (from the one or more nitrogen-carbon bonds of the carbon-nitrogen framework) bonds with the silicon of the silicon-containing electroactive material. In certain instances, the precursor layer may comprise a matrix precursor, which may be cured or cross-linked. After heating to pyrolyze, the matrix precursor can then form a carbonaceous material matrix. In certain aspects, the matrix itself may also be a nitrogen-doped carbon material after the heating/pyrolysis step, depending on selection of the matrix precursor.

In certain instances, the nitrogen-containing carbon coating may be formed on the exposed surfaces of the silicon-containing electroactive material before the precursor layer is placed onto the metallic substrate. In such instances, the precursor layer includes the coated electroactive particles, the electronically conducting materials, and the solvent.

In various variations, after heating the mixture of the silicon-containing electroactive material and the precursor layer to a temperature ranging from greater than or equal to about 200° C. to less than or equal to about 1300° C. for a duration of greater than or equal to about 1 hour to less than or equal to about 24 hours, the method may further include calendaring or curing/cross-linking by heating the mixture to a temperature ranging from greater than or equal to about 200° C. to less than or equal to about 1,300° C., optionally from greater than or equal to about 200° C. to less than or equal to about 600° C. and in certain aspects, optionally from greater than or equal to about 200° C. to less than or equal to about 450° C. In certain instances, curing may occur for a duration of greater than or equal to about 1 hour to less than or equal to about 24 hours and optionally greater than or equal to about 1 hour to less than or equal to about 4 hours. The duration of the curing may be selected to accommodate the elected batch size.

In still other variations, after heating the mixture of the silicon-containing electroactive material and the precursor layer to a temperature ranging from greater than or equal to about 200° C. to less than or equal to about 1300° C. for a duration of greater than or equal to about 1 hour to less than or equal to about 24 hours and curing the mixture using a non-thermal means, for example, by ultraviolet radiation, the method may further include pyrolyzing by heating the precursor layer and the copper substrate to a temperature ranging from greater than or equal to about 500° C. to less than or equal to about 1,300° C., optionally from greater than or equal to about 600° C. to less than or equal to about 1,300° C., optionally from greater than or equal to about 900° C. to less than or equal to about 1,300° C., and in certain aspects, optionally from greater than or equal to about 900° C. to less than or equal to about 1,200° C. In certain instances, pyrolysis may occur for a duration ranging from greater than or equal to about 30 minutes to less than or equal to about 24 hours, and in certain aspects, optionally from greater than or equal to about 1 hour to less than or equal to about 4 hours. The duration of the pyrolysis may be selected to accommodate the elected batch size.

In still further variations, after curing and/or pyrolyzing the mixture of the silicon-containing electroactive material and the precursor layer, the method may further include annealing by heating the precursor layer and the copper substrate to a temperature ranging from greater than or equal to about 700° C. to less than or equal to about 1300° C., and in certain aspects, optionally from greater than or equal to about 900° C. to less than or equal to about 1300° C. Annealing may occur for a duration of greater than or equal to about 1 hour to less than or equal to about 4 hours. The duration of the annealing may be selected to accommodate the elected batch size.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method of forming a polymeric-binder-free electrode for use in an electrochemical cell that cycles lithium ions, the method comprising:
    disposing a precursor layer onto at least a select region of a surface of a metallic substrate to form the polymeric-binder-free electrode, wherein the precursor layer comprises:
        a silicon-containing electroactive material particle,
        one or more nitrogen-containing precursor materials selected from the group consisting of: melamine, cyanuric acid, nicotine, 1,10-phenanthroline, carbazole, adenine, guanine, dopamine, branched or linear poly(ethyleneimine), poly(4-vinylpyridine), poly(3,5-pyridine), poly(4-vinylpyridine-co-divinylbenzene), poly(4-vinylpyridine-co-styrene), poly(melamine-co-formaldehyde), polypyrrole, polyaniline, and combinations thereof,
        a solvent,
        a matrix precursor comprising a polymeric material, and
        greater than or equal to about 1 wt. % to less than or equal to about 20 wt. % of a filamentary copper; and
    heating at least a region of the precursor layer and the metallic substrate to a temperature ranging from greater than or equal to about 200° C. to less than or equal to about 1300° C. to form a nitrogen-containing carbon coating on exposed surfaces of the silicon-containing electroactive material particle.

2. The method of claim 1, wherein the method further comprises pyrolyzing by heating the precursor layer and the substrate to a temperature ranging from greater than or equal to about 600° C. to less than or equal to about 900° C.

3. The method of claim 1, wherein the method further comprises annealing by heating the precursor layer and the metallic substrate to a temperature ranging from greater than or equal to about 900° C. to less than or equal to about 1,300° C.

4. The method of claim 1, wherein the heating is localized and applied using one of ultrasonic and microwave heating techniques.

5. The method of claim 1, wherein the precursor layer is disposed onto a surface of the metallic substrate by solvent-casting, and
    wherein the solvent is selected from the group consisting of: N-methyl-2-pyrrolidone (NMP), methanol, ethanol, isopropanol, water, and combinations thereof.

6. The method of claim 1, wherein the metallic substrate comprises copper, nickel, or alloys thereof, and
    wherein the metallic substrate is in the form of one of a woven mesh and a slit foil.

7. The method of claim 1, wherein the silicon-containing electroactive material particle is a plurality of nanoparticles that comprises one or more nano-sized particles having an average diameter ranging from greater than or equal to about 100 nm to less than or equal to about 500 nm and micron-sized particles having an average diameter ranging from greater than or equal to about 1 μm to less than or equal to about 5 μm.

8. The method of claim 1, wherein the silicon-containing electroactive material particle is a plurality of particles having an average diameter ranging from greater than or equal to about 100 nm to less than or equal to about 10 μm, and wherein the nitrogen-containing carbon coating has an average thickness that ranges from greater than or equal to about 2 nm to less than or equal to about 40 nm.

9. The method of claim 1, wherein the precursor layer further comprises an electronically conducting material selected from the group consisting of carbon fibers, carbon nanotubes, carbon black, graphite particles, graphene sheet, and combinations thereof.

10. The method of claim 1, wherein the heating forms an electrically conductive carbonaceous matrix wherein the silicon-containing electroactive material particle having the nitrogen-containing carbon coating is dispersed throughout the electrically conductive matrix to form the polymeric-binder-free electrode.

* * * * *